United States Patent
Hsu et al.

(10) Patent No.: US 7,036,135 B2
(45) Date of Patent: Apr. 25, 2006

(54) SPINDLE MOTOR CENTERING DEVICE

(75) Inventors: Jin-juh Hsu, Taoyuan (TW);
Ming-tung Chuang, Yunlin County (TW); Atsushi Okada, Gumma (JP)

(73) Assignee: Delta Electronics, Inc., (TW)

( * ) Notice: Subject to any disclaimer, the term of this patent is extended or adjusted under 35 U.S.C. 154(b) by 209 days.

(21) Appl. No.: 10/712,709

(22) Filed: Nov. 12, 2003

(65) Prior Publication Data

US 2005/0022223 A1    Jan. 27, 2005

(30) Foreign Application Priority Data

Jul. 24, 2003   (TW) .............................. 92120247 A

(51) Int. Cl.
*G11B 17/028*   (2006.01)
(52) U.S. Cl. ...................... 720/707; 720/704
(58) Field of Classification Search ................ 720/715, 720/707, 703, 704, 712, 706, 658, 604, 723, 720/724; 369/271, 270, 271.1; 360/99.12
See application file for complete search history.

(56) References Cited

U.S. PATENT DOCUMENTS

| | | | | |
|---|---|---|---|---|
| 4,730,300 A | * | 3/1988 | Kamoshita et al. ......... | 720/704 |
| 4,787,079 A | * | 11/1988 | Ueno ......................... | 720/707 |
| 5,501,760 A | * | 3/1996 | Mukawa ..................... | 156/305 |
| 6,363,048 B1 | * | 3/2002 | Wu et al. ................... | 720/707 |
| 6,525,441 B1 | * | 2/2003 | Yamaguchi .................. | 310/90 |
| 6,868,549 B1 | * | 3/2005 | Watanabe et al. ........... | 720/715 |
| 6,957,443 B1 | * | 10/2005 | Horng et al. ............... | 720/707 |
| 2003/0026193 A1 | * | 2/2003 | Shiomi et al. ............. | 369/270 |
| 2004/0205803 A1 | * | 10/2004 | Horng et al. ............... | 720/707 |
| 2005/0223401 A1 | * | 10/2005 | Fukasawa ................... | 720/706 |

* cited by examiner

*Primary Examiner*—Allen Cao
(74) *Attorney, Agent, or Firm*—Martine Penilla & Gencarella, LLP

(57) ABSTRACT

Disclosed is a centering device of a spindle motor. The centering device includes a body portion which is disposed on the rotor of the spindle motor, and which is provided with a central hole for accommodating the shaft of the spindle motor; and a plurality of centering elastic finger units, located along the periphery of the body portion. Each centering elastic finger unit includes at least two elastic fingers. Each elastic finger includes a free end which extends from the body portion in the circumferential direction of the rotor, and which has a contact portion adapted to urge against an optical disk to guide the centering of the optical disk with respect to the shaft of the spindle motor. Preferably, the contact portion is formed into an arc surface so as to reduce the contact area and thus the friction between the elastic fingers and the disk.

18 Claims, 7 Drawing Sheets

2

SPINDLE MOTOR CENTERING DEVICE

BACKGROUND OF THE PRESENT INVENTION

1. Field of the Present Invention

The present invention relates to a spindle motor centering device, and more particularly, to a centering device installed on a thin-type spindle motor to carry out the centering of a disk with respect to the rotating shaft of the spindle motor.

2. Description of the Related Art

The rising development of information storage media due to the progress in information technologies has caught a lot of attention. In this rising development, the spindle motor has been playing a key role. The spindle motor, being compact in size, has become the most popular device for driving an information storage media such as an optical disk drive or a floppy disk drive. There are various types of spindle motor, any one of which mainly includes a rotating shaft, a rotor, a stator, and a supporting surface for bearing and carrying an optical disk. Here, the supporting surface can be the surface of a separately provided supporting plate or the surface of the motor rotor itself.

Since the spindle motor usually drives the optical disk at a high rotating speed in the order of thousands of revolutions per minute (rpm), especially when applied to drive a DVD-ROM, the radial run-out accuracy of the optical disk is strictly required. Generally, an optical disk has a tolerance of at least 0.15 mm in the radius of its central hole, and the error in the radius of its central hole may significantly influence its radial run-out accuracy. In order to reduce or avoid the radial run-out of the optical disk caused by the error in the radius of its central hole, a centering device is usually installed on the spindle motor for holding and centering the optical disk so as to prevent the radial run-out of the optical disk and thus to improve the reading, playing, and recording accuracy of the optical disk.

FIGS. 1A and 1B, respectively, show the top view and the sectional view of a conventional spindle motor centering device. As illustrated in FIG. 1A and FIG. 1B, a spindle motor 1 includes a stator 5 around which is wound with coils 6, a shaft 2 supported within the stator 5 through a bearing 3 and a washer 4, a rotor 7 on which is installed with a permanent magnet 8, an anti-slip sheet 9 for preventing an optical disk (not shown) mounted thereon from sliding, and a centering device 10, made of resin, for holding and centering the optical disk. The centering device 10 includes a body portion 10b provided with a central hole for accommodating the shaft 2 of the spindle motor, and several centering elastic fingers 10a each of which has a free end extending from the body portion 10b in the axial direction of the spindle motor 1 as shown in FIGS. 1B and 2. When an optical disk 13 is mounted onto a predetermined axial position in the spindle motor 1 as shown in FIG. 2, some centering elastic fingers 10a contact and urge against the surface of the central hole of the optical disk 13 so as to center the optical disk 13.

In another conventional spindle motor centering device as shown in FIGS. 3A and 3B, a separate supporting plate 14 is additionally provided on the surface of the rotor 7 to bear and carry the optical disk. Similar centering device includes a body portion 16, and several centering elastic fingers 15 extending from the body portion 16 are used to process the centering of the optical disk.

However, as the spindle motor continuously becomes thinner, the free end of the conventional centering elastic finger, extending in the axial direction of the spindle motor, are shortened gradually which, in turn, causes the rigidity of the centering elastic finger to become larger and larger. The increased rigidity of the centering elastic finger further causes an increased resistance, generated by the centering elastic fingers, tending to hinder the optical disk from being moved to its predetermined axial position, and thus makes the mounting of the optical disk difficult. Besides, the conventional centering device further suffers from the problem of resin fatigue in the centering elastic fingers caused by repeated bending due to repeated contacts between the centering elastic fingers and the optical disk, and also from the problem of creep due to operation under high temperature.

SUMMARY OF THE PRESENT INVENTION

Therefore, the present invention intends to provide a centering device that can fully avoid the above-mentioned problems and perfectly perform its centering functions even when applied to a thin-type spindle motor.

One object of the present invention is to ensure that the disk can be accurately centered even in the case of a thin-type spindle motor.

Another object of the present invention is to reduce the force that must be imposed on the disk for mounting the disk to its predetermined axial position in a spindle motor.

In a spindle motor having a rotor and a shaft, a spindle motor centering device according to the first aspect of the present invention includes: a body portion which is disposed on the rotor, and is provided with a central hole for accommodating the shaft of the spindle motor; and a plurality of centering elastic finger units, located along the periphery of the body portion, each centering elastic finger unit comprising at least two elastic fingers. In the above spindle motor centering device, each of the elastic fingers includes a free end which extends from the body portion in the circumferential direction of the rotor, and which has a contact portion adapted to urge against an optical disk to guide the centering of the optical disk with respect to the shaft of the spindle motor.

As explained above, in the case of the afore-mentioned conventional centering devices, the rigidity of each elastic finger is large particularly when the centering device is applied to a thin-type spindle motor, since the free end of each elastic finger extending in the axial direction of the spindle motor is shortened when the thickness of the motor is reduced. In contrast, the rigidity of the elastic finger in the centering device according to the present invention is reduced because the contact portion of each elastic finger can extend away from the juncture of the elastic finger and the body portion as desired.

In the above spindle motor centering device according to the first aspect of the present invention, preferably the contact portion is formed into an arc surface.

In the above spindle motor centering device, preferably the material for the body portion and the centering elastic finger units is selected from a group consisting of polymer material, metal material, and composite material.

Optionally, the centering device and the rotor may be separable or integrally formed with each other.

In a spindle motor having a rotor, a shaft, and a disk supporting plate, a spindle motor centering device according to the second aspect of the present invention includes: a body portion which is disposed on the disk supporting plate and is provided with a central hole for accommodating the shaft of the spindle motor; and a plurality of centering elastic finger units, located along the periphery of the body portion, each centering elastic finger unit comprising at least two elastic fingers. In the above spindle motor centering device, each of the elastic fingers includes a free end which extends from the body portion in the circumferential direction of the rotor, and which has a contact portion adapted to urge against an optical disk to guide the centering of the optical disk with respect to the shaft of the spindle motor.

In the above spindle motor centering device according to the second aspect of the present invention, preferably the contact portion is formed into an arc surface.

In the above spindle motor centering device, preferably the material for the body portion and the centering elastic finger units is selected from a group consisting of polymer material, metal material, and composite material.

Optionally, the centering device and the disk supporting plate may be separable, or integrally formed with each other.

The advantages of the spindle motor centering devices according to the present invention are as follows. First, it is ensured that the disk can be accurately centered even in the case of a thin-type spindle motor. Second, the force that must be imposed on the disk for mounting the disk to its predetermined axial position in a spindle motor may be reduced even in the case when applied to a thin-type spindle motor, due to the minimum friction design between the arc contact surface of each elastic finger with the disk, and also due to the reduced rigidity design of each elastic finger that has a free end extending in the circumferential direction of the rotor rather than in the axial direction. In addition, the lifespan of the elastic fingers can be lengthened due to the above reasons.

DETAILED DESCRIPTION OF THE PREFERRED EMBODIMENTS

When mounting a centering device in a spindle motor, usually it is the surface of the rotor of the spindle motor rather than the surface of a separately provided disk supporting plate that is used as the disk supporting surface so as to reduce the overall height of the spindle motor. Consequently, the first embodiment according to the present invention takes this case as an example for illustrating the centering of an optical disk.

Figure 1A:
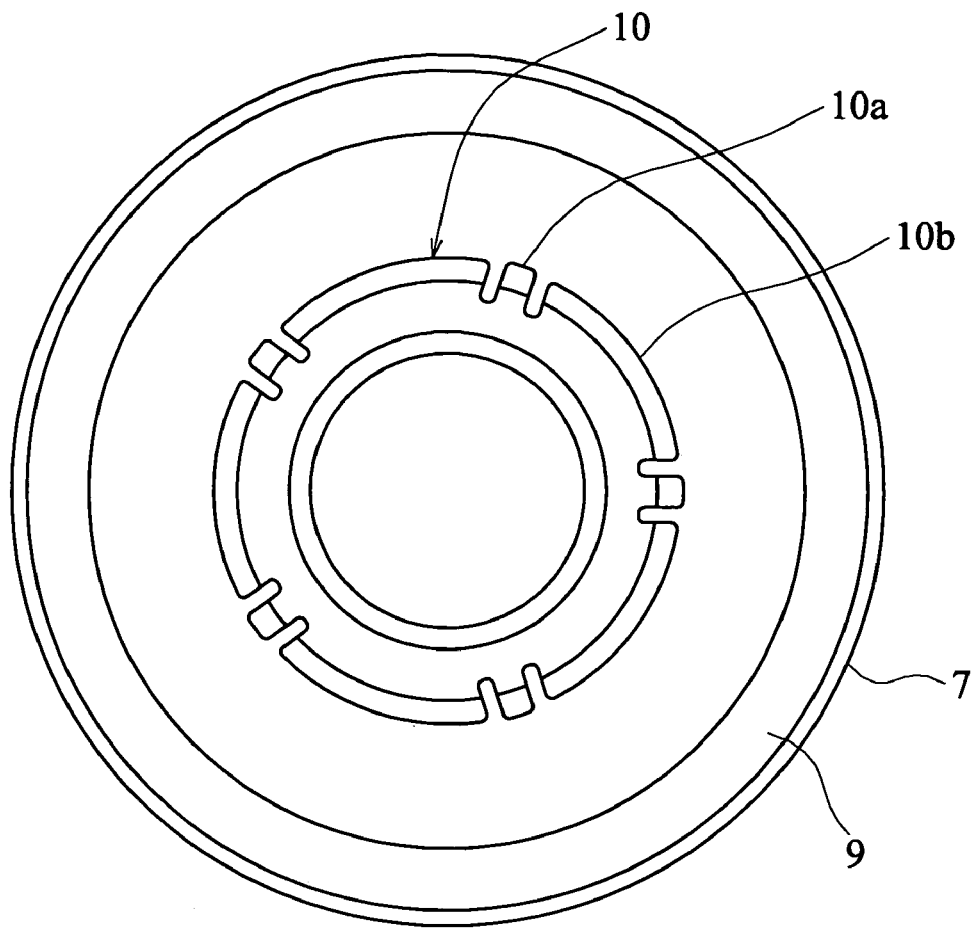
FIG. 1A is a top view of a conventional spindle motor centering device.
Figure 1B:
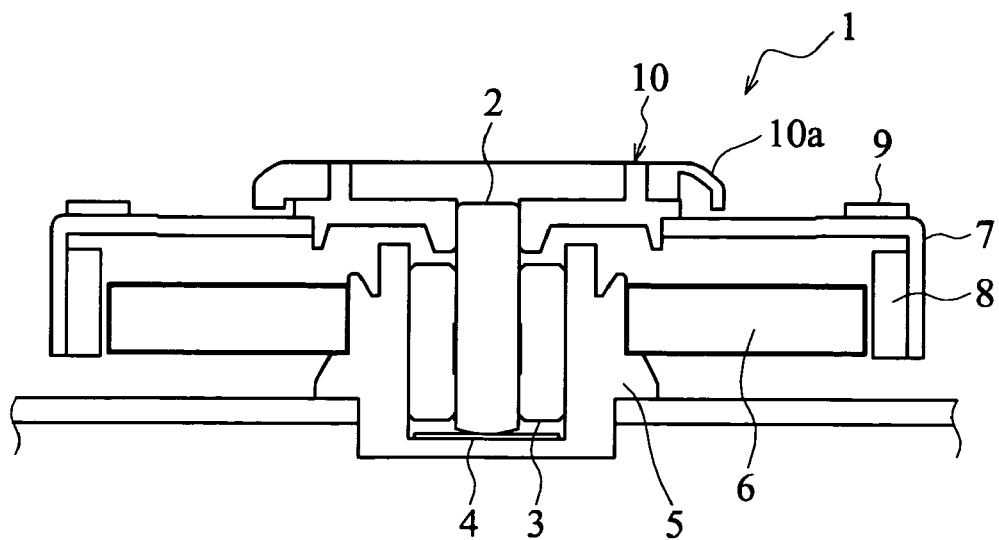
FIG. 1B is a sectional view of the spindle motor centering device shown in FIG. 1A.
Figure 2:
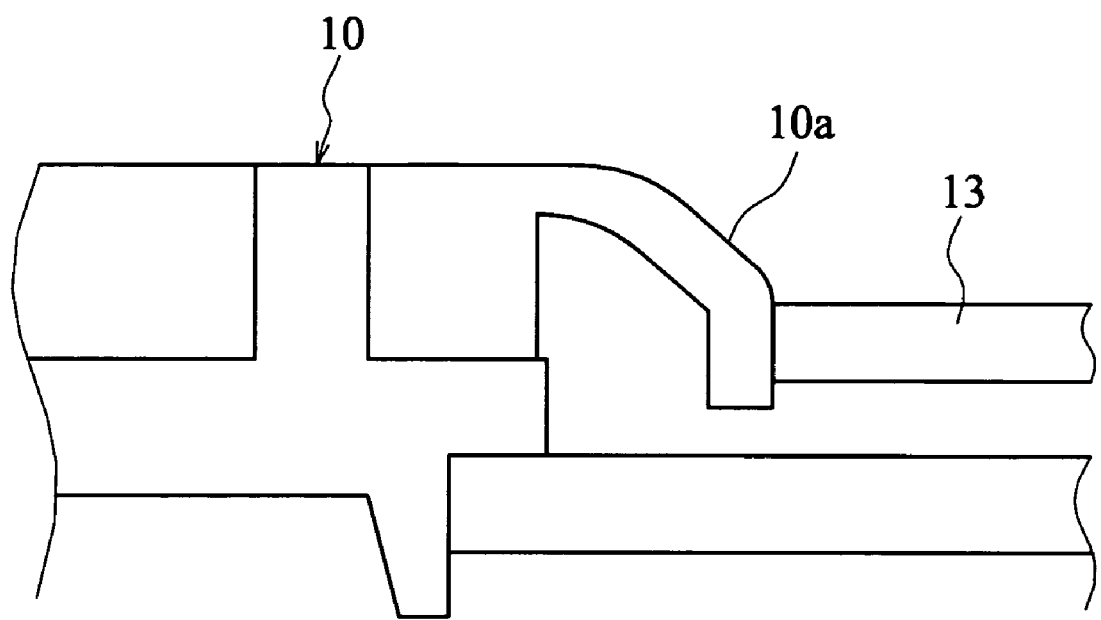
FIG. 2 is a partially enlarged sectional view of the spindle motor centering device shown in FIG. 1A.
Figure 3A:
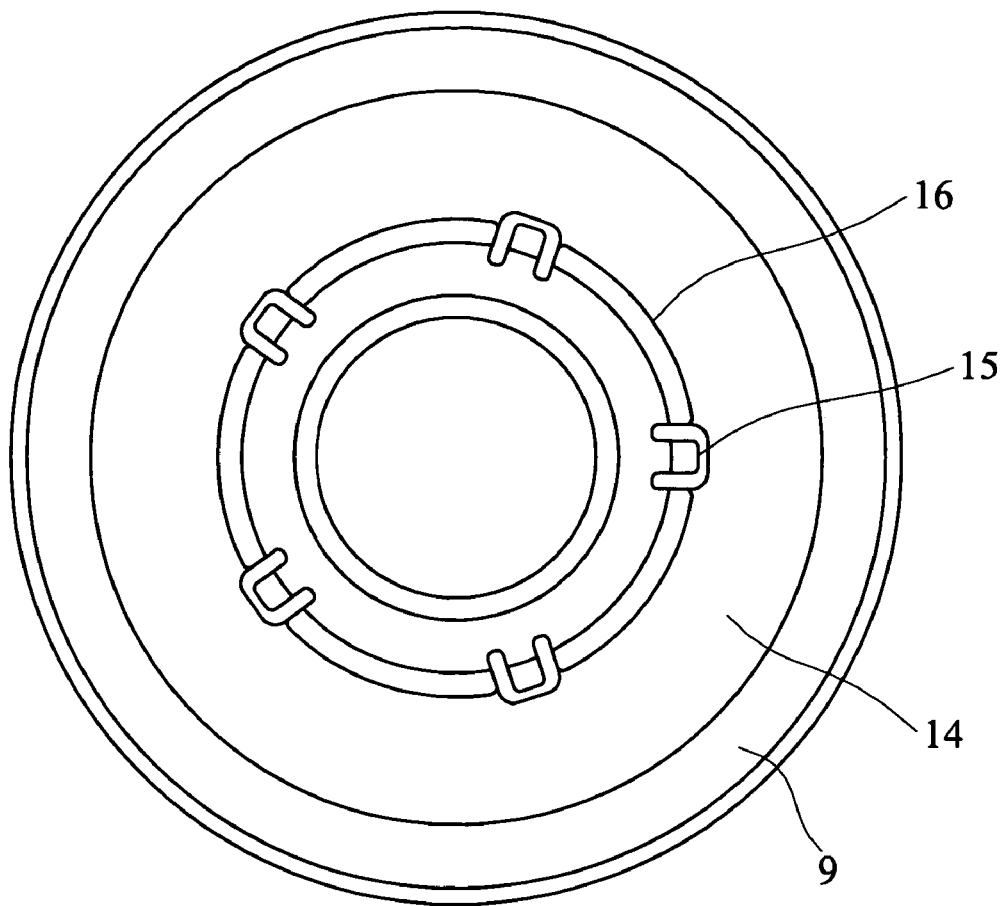
FIG. 3A is a top view of another conventional spindle motor centering device.
Figure 3B:
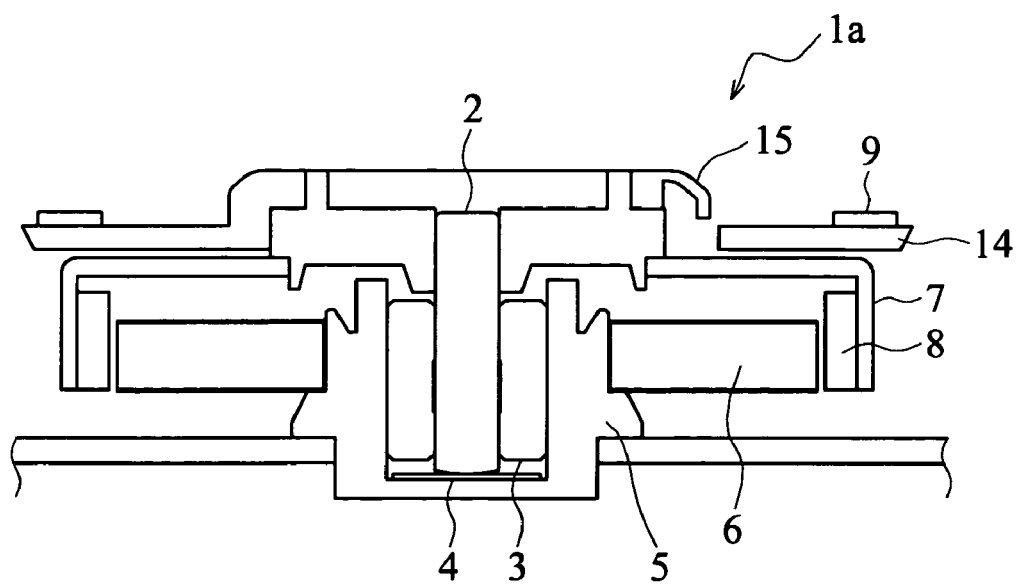
FIG. 3B is a sectional view of the spindle motor centering device shown in FIG. 3A.
Figure 4A:
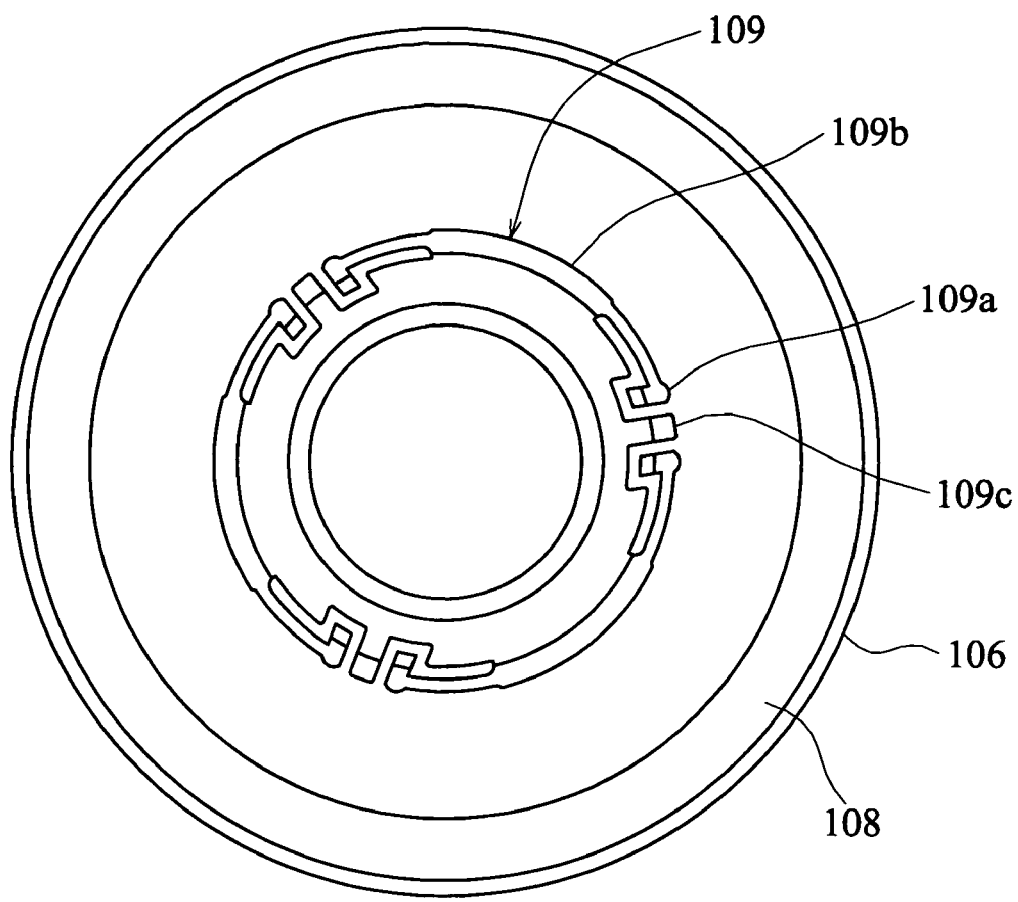
FIG. 4A is a top view of a spindle motor centering device according to the first embodiment of the present invention.
Figure 4B:
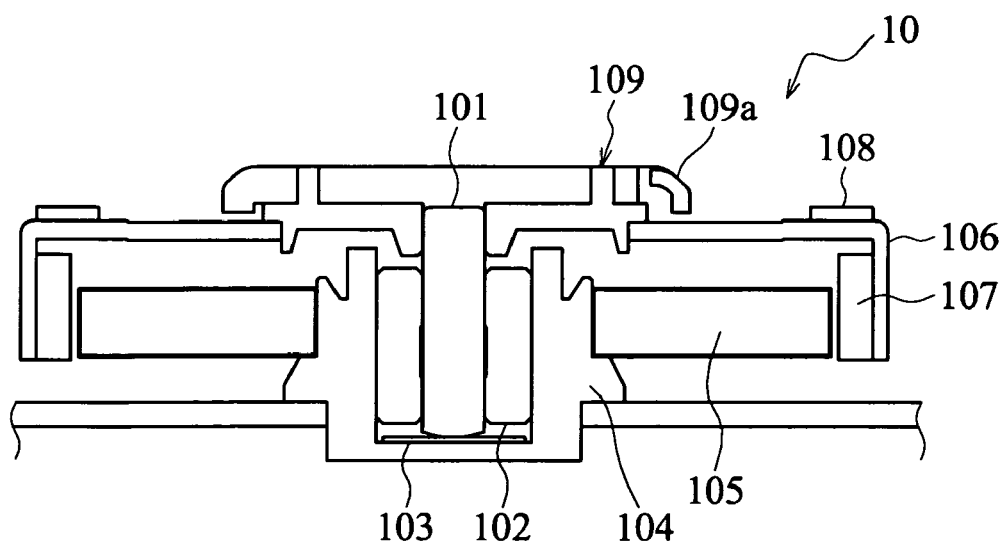
FIG. 4B is a sectional view of the spindle motor centering device shown in FIG. 4A.

Referring to FIGS. 4A and 4B, a spindle motor 10 according to the first embodiment of the present invention includes a stator 104 around which is wound with coils 105, a shaft 101 supported within the stator 104 through a bearing 102 and a washer 103, a rotor 106 on which is installed with a permanent magnet 107, an anti-slip sheet 108 for preventing an optical disk (not shown) mounted thereon from sliding, and a centering device 109 for centering the optical disk. The centering device 109 includes a body portion 109b and a plurality of centering elastic finger units (109a, 109c). In FIG. 4A, three centering elastic finger units (109a, 109c) are shown. The body portion 109b is disposed on the rotor 106, and is provided with a central hole for accommodating the shaft 101 of the spindle motor 10. The plurality of centering elastic finger units (109a, 109c) is evenly arranged along the periphery of the body portion 109b. Each centering elastic finger unit includes a pair of elastic fingers 109a adapted to contact and urge against an optical disk to guide the centering of the optical disk with respect to the shaft 101 of the spindle motor 10, and a stopping portion 109c located circumferentially between the pair of elastic fingers 109a. In each centering elastic finger unit, both the pair of elastic fingers 109a and the stopping portion 109c are integrally formed with the body portion 109b (see FIG. 5). As clearly shown in FIG. 5 or 6, within each centering elastic finger unit, the free ends of the pair of elastic fingers 109a, on the two sides of the stopping portion 109c, extend from the body portion 109b in circumferentially opposite directions. The centering device 109 and the rotor 106 can be either two separate components or an integral component.

Figure 6:
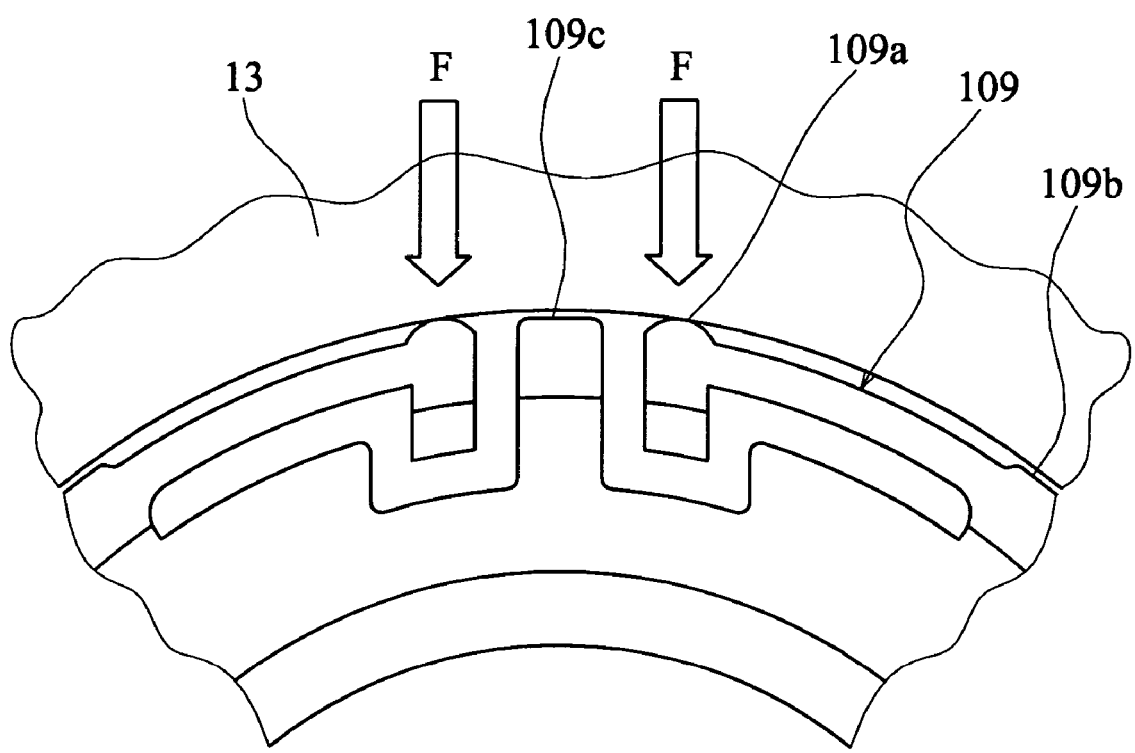
FIG. 6 is a partially enlarged top view illustrating the contact between a disk and the spindle motor centering device shown in FIG. 4A.

Referring to FIGS. 4A and 6, when mounting a disk 13 onto the spindle motor, if the disk 13 is not well centered, the inner surface of the central hole of the disk 13 will push against the three pairs of elastic fingers 109a unevenly. For example, provided that the one pair of elastic fingers 109a shown in FIG. 6 is pushed inwards in the direction of arrow F till the inner surface of the central hole of the disk 13 is stopped by the stopping portion 109c between the pair of elastic fingers 109a, causing an elastic deflection at same pair of elastic fingers 109a, then the pair of deflected elastic fingers 109a will push the disk 13 back in the opposite direction of arrow F by an elastic restoring force proportional to its elastic deflection. When two or three pairs of elastic fingers 109a are simultaneously deflected to different extents, they will, independently, push the disk 13 back in the opposite directions of their respective deflected directions proportional to their respective elastic deflections. Consequently, the disk can be accurately centered through the cooperative operation of the three centering elastic finger units.

Figure 5:
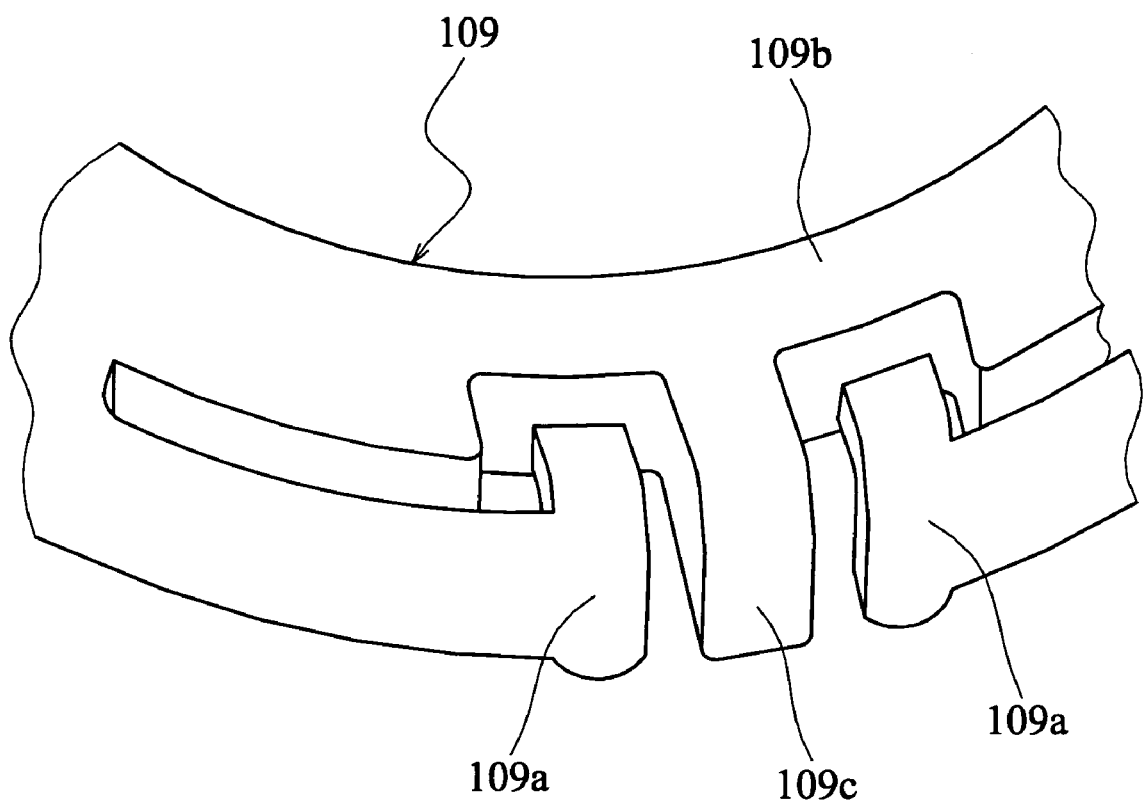
FIG. 5 is a partially enlarged perspective view of the spindle motor centering device shown in FIG. 4A.

Each elastic finger 109a has a contact portion for urging against the optical disk 13 to guide the centering of the disk 13. In order to reduce the friction force between the contact portion of the elastic finger 109a and the disk 13, the contact portion is preferably formed into an arc surface as shown in FIG. 5 or 6 so that the elastic fingers 109a and the disk 13 contact each other substantially by a point contact.

Figure 7A:
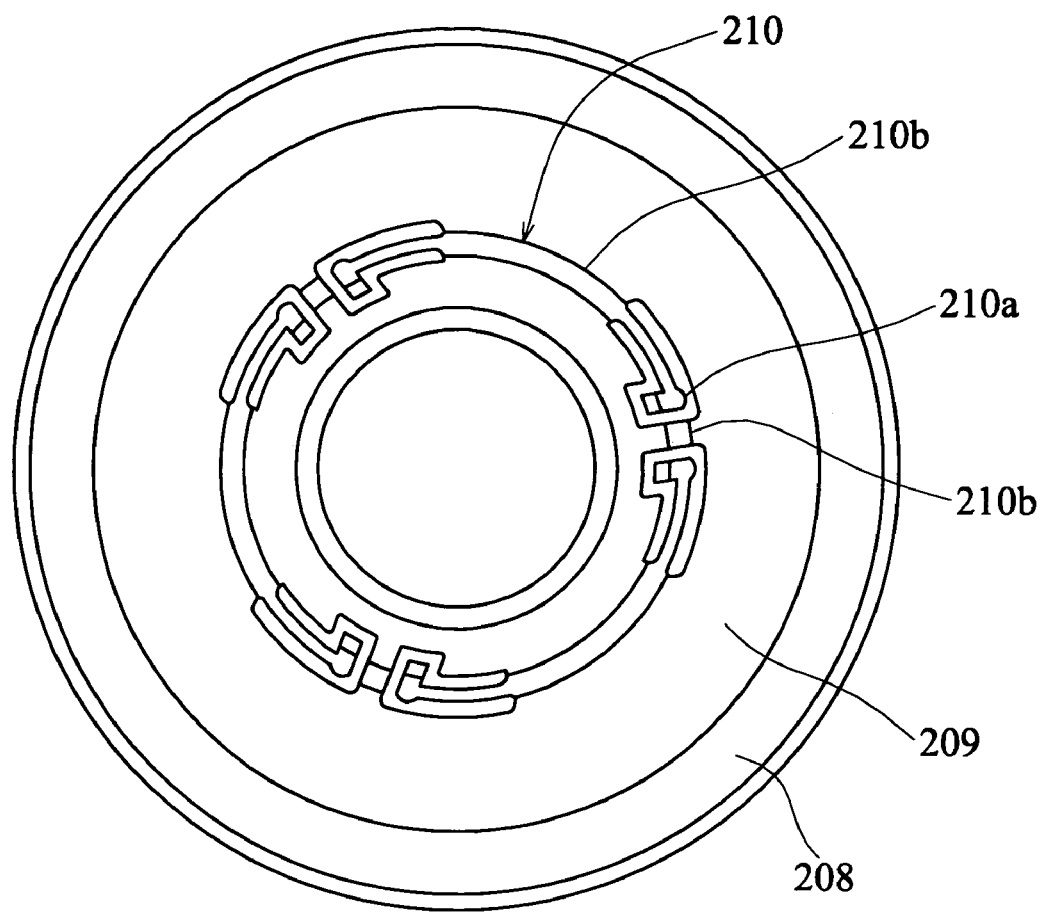
FIG. 7A is a top view of a spindle motor centering device according to another embodiment of the present invention.
Figure 7B:
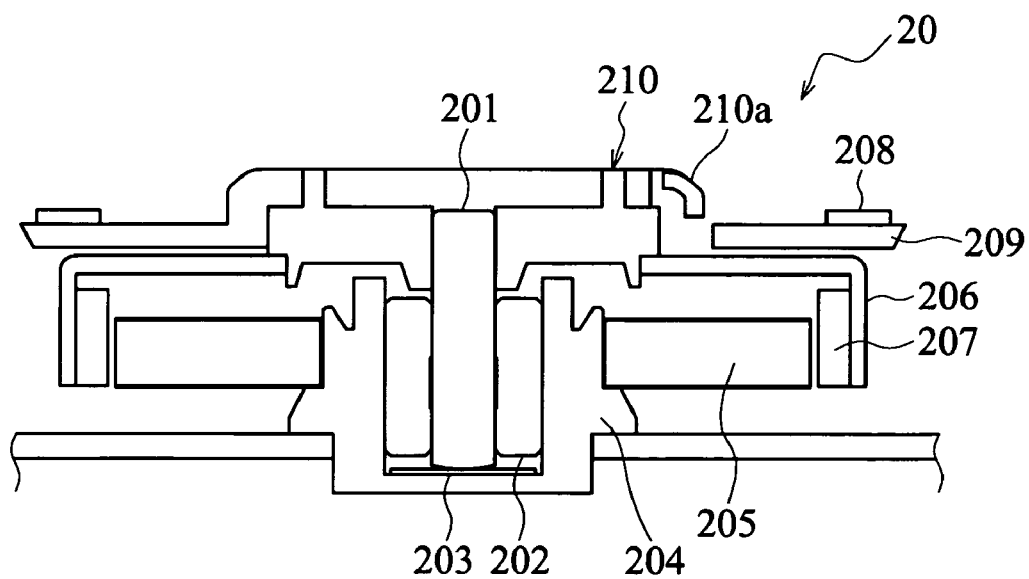
FIG. 7B is a sectional view of the spindle motor centering device shown in FIG. 7A.

Referring to FIGS. 7A and 7B, a spindle motor 20 according to the second embodiment of the present invention includes a stator 204 around which is wound with coils 205, a shaft 201 supported within the stator 204 through a bearing 202 and a washer 203, a rotor 206 on which is installed with a permanent magnet 207, an anti-slip sheet 208 for preventing an optical disk (not shown) mounted thereon from sliding, a disk supporting plate 209, and a centering device 210 for holding and centering the optical disk. In this embodiment, the centering device 210 and the disk supporting plate 209 are shown to be separate components. However, they may also be integrally formed. The disk supporting plate 209 and the anti-slip sheet 208 together provide a supporting surface for supporting the optical disk.

The centering device 210 includes a body portion 210b and a plurality of centering elastic finger units. In FIG. 7A, three centering elastic finger units are shown. The body portion 210b is disposed on the disk supporting plate 209, and is provided with a central hole for accommodating the shaft 201 of the spindle motor 20. The three centering elastic finger units are evenly arranged along the periphery of the body portion 210b. Each centering elastic finger unit includes a pair of elastic fingers 210a adapted to urge against the optical disk to guide the centering of the optical disk with respect to the shaft 201 of the spindle motor 20. All the elastic fingers 210a are integrally formed with the body portion 210b. As shown in FIG. 7A, within each centering elastic finger unit, the free ends of the pair of elastic fingers 210a extend from the body portion 210b in circumferentially opposite directions.

Similarly, by use of the centering device according to the second embodiment shown in FIGS. 7A and 7B, a disk can be accurately centered through the cooperative operation of the plurality of centering elastic finger units, and the friction force between the contact portion of the elastic finger 210a and the disk can be reduced by forming the contact portion into an arc surface so that the elastic fingers 210a and the disk contact each other substantially by a point contact. Detailed description regarding the above is similar to that in the first embodiment and is thus omitted.

In the foregoing two embodiments, the accompanying drawings (FIGS. 4A and 7A) show that three centering elastic finger units are included in the spindle motor centering device. However, the spindle motor centering device may include more than three centering elastic finger units. Besides, though it is described in the foregoing two embodiments that each centering elastic finger unit includes a pair of elastic fingers, the number of elastic fingers included in each centering elastic finger unit is not limited to two.

The material for the body portion and the elastic fingers in the foregoing two embodiments is selected from a group consisting of polymer material, metal material, and composite material.

The above embodiments intend to illustrate the present invention but not to limit the present invention to the specific embodiments. Accordingly, various modifications and changes may be made without departing from the spirit and scope of the present invention as described in the following claims.

What is claimed is:

1. A centering device of a spindle motor having a rotor and a shaft, said centering device comprising:
   a body portion which is disposed on the rotor, and is provided with a central hole for accommodating the shaft of the spindle motor; and
   a plurality of centering elastic finger units, located along the periphery of the body portion, each centering elastic finger unit comprising at least two elastic fingers,
   wherein each of said elastic fingers comprises a free end which extends from the body portion in the circumferential direction of the rotor, and which has a contact portion adapted to urge against an optical disk to guide the centering of the optical disk with respect to the shaft of the spindle motor.

2. The centering device as claimed in claim 1, wherein said contact portion is formed into an arc surface.

3. The centering device as claimed in claim 1, wherein the material for the body portion and the centering elastic finger units is selected from a group consisting of polymer material, metal material, and composite material.

4. The centering device as claimed in claim 1, wherein said centering device and said rotor are separable.

5. The centering device as claimed in claim 1, wherein said centering device is integrally formed with said rotor.

6. A centering device of a spindle motor having a rotor, a shaft, and a disk supporting plate, said centering device comprising:
   a body portion which is disposed on the disk supporting plate and is provided with a central hole for accommodating the shaft of the spindle motor; and
   a plurality of centering elastic finger units, located along the periphery of the body portion, each centering elastic finger unit comprising at least two elastic fingers,
   wherein each of said elastic fingers comprises a free end which extends from the body portion in the circumferential direction of the rotor, and which has a contact portion adapted to urge against an optical disk to guide the centering of the optical disk with respect to the shaft of the spindle motor.

7. The centering device as claimed in claim 6, wherein said contact portion is formed into an arc surface.

8. The centering device as claimed in claim 6, wherein the material for the body portion and the centering elastic finger units is selected from a group consisting of polymer material, metal material, and composite material.

9. The centering device as claimed in claim 6, wherein said centering device and said disk supporting plate are separable.

10. The centering device as claimed in claim 6, wherein said centering device, and said disk supporting plate are integrally formed.

11. A motor comprising:
    a rotor;
    a shaft; and
    a centering device comprising:
        a body portion which is disposed on the rotor, and is provided with a central hole for accommodating the shaft; and
        a plurality of elastic finger units, located along the periphery of the body portion, each elastic finger unit comprising at least two elastic fingers,
    wherein each of said elastic fingers comprises a free end which extends from the body portion along the circumferential direction of the rotor.

12. The motor as claimed in claim 11, wherein each of said elastic fingers has a contact portion adapted to urge against an optical disk to guide the centering of the optical disk with respect to the shaft.

13. The motor as claimed in claim 12, wherein said contact portion is formed into an arc surface.

14. The motor as claimed in claim 11, wherein the material for the body portion and the elastic finger units is selected from a group consisting of polymer material, metal material, and composite material.

15. The motor as claimed in claim 11, wherein said centering device and said rotor are separable.

16. The motor as claimed in claim 11, wherein said centering device is integrally formed with said rotor.

17. The motor as claimed in claim 11, further comprising a disk supporting plate provided on a surface of said rotor, and the body portion is disposed on the disk supporting plate to bear and carry an optical disk.

18. The motor as claimed in claim 17, wherein said centering device, and said disk supporting plate are integrally formed.

* * * * *